United States Patent

Bonnette et al.

[11] Patent Number: 6,032,367
[45] Date of Patent: Mar. 7, 2000

[54] CUTTING DEVICE

[76] Inventors: Eddie Bonnette, 822 Country Wood Cir., Sour Lake, Tex. 77659; Tim Rozell, 2804 Executive Dr., Chester, Va. 23831

[21] Appl. No.: 09/044,318

[22] Filed: Mar. 19, 1998

[51] Int. Cl.⁷ .................................................. B23D 21/06
[52] U.S. Cl. ................................................. 30/101; 30/102
[58] Field of Search ............................... 30/102, 101, 96, 30/97, 98

[56] References Cited

U.S. PATENT DOCUMENTS 3,335,492  8/1967  Spiro .......................................... 30/101

*Primary Examiner*—Douglas D. Watts

[57] ABSTRACT

A new cutting device for cutting tubing and piping. The inventive device includes a housing having separable first and second portions. The first and second portions each have an inner face and are pivotally coupled together such that the first and second portions are pivotable with respect to one another between an open position and a closed position. A bore extends between the first and second faces of the housing. The second portion of the housing has a pair of rollers mounted in the interior of the second portion. The rollers are positioned adjacent the bore such that a portion of each of the rollers extends into the bore. The first portion of the housing has a slot extending between the perimeter side wall and the inner face of the first portion of the housing. The slot also has an opening into the bore. A disk shaped cutting blade is disposed in the slot and mounted to the first portion of the housing such that a portion of the cutting blade extends into the bore.

7 Claims, 4 Drawing Sheets

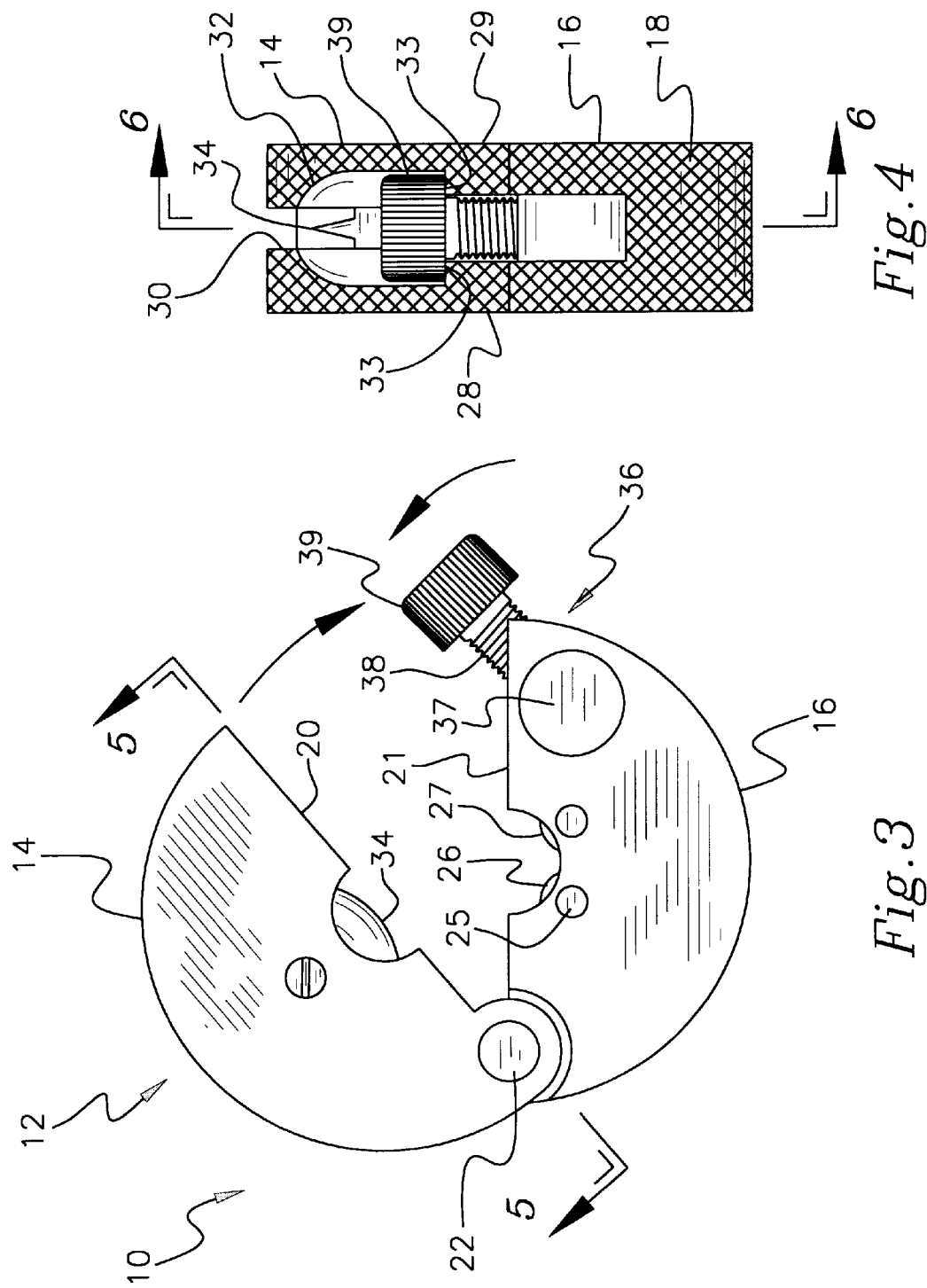

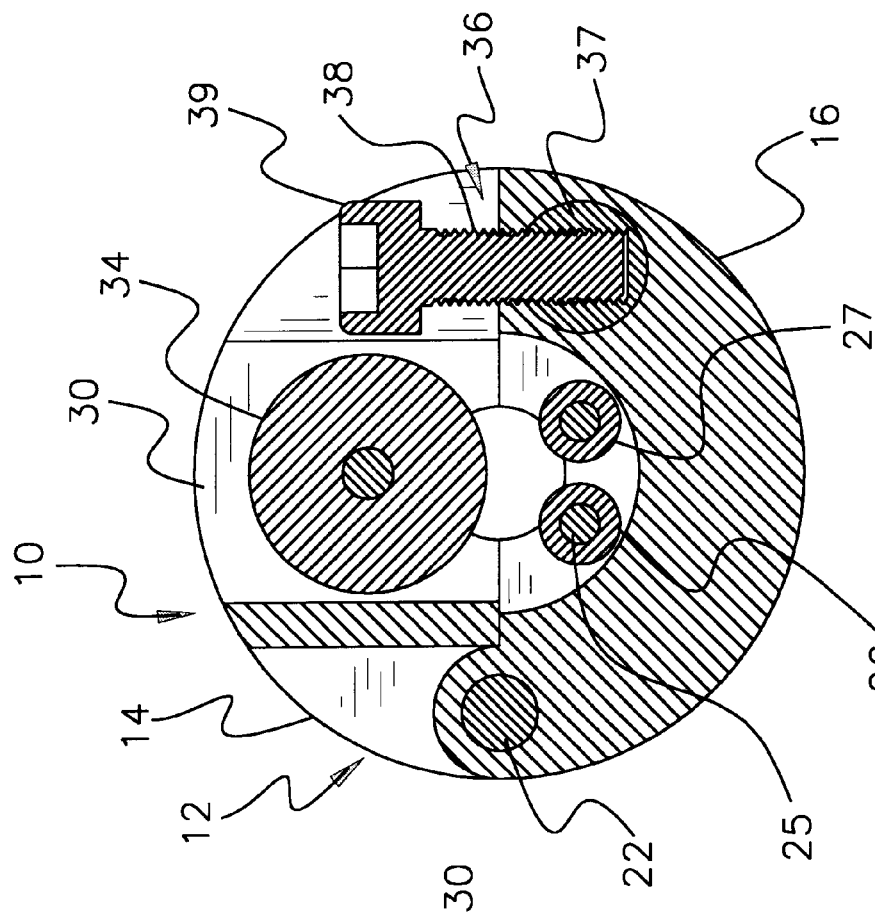
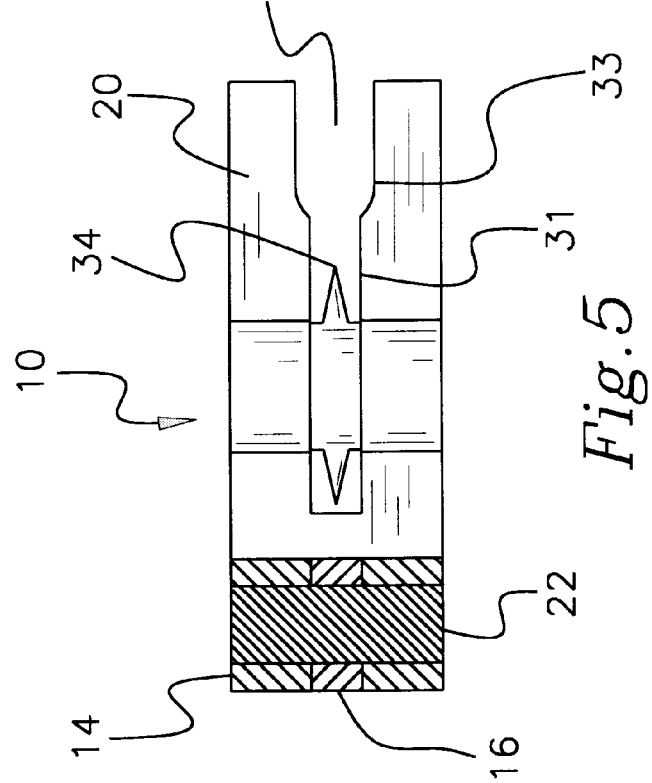

CUTTING DEVICE

BACKGROUND OF THE INVENTION

Field of the Invention

The present invention relates to cutting devices for cutting tubing and more particularly pertains to a new cutting device for cutting tubing and piping.

Description of the Prior Art

The use of cutting devices for cutting tubing is known in the prior art. More specifically, cutting devices for cutting tubing heretofore devised and utilized are known to consist basically of familiar, expected and obvious structural configurations, notwithstanding the myriad of designs encompassed by the crowded prior art which have been developed for the fulfillment of countless objectives and requirements.

Known prior art cutting devices for cutting tubing include U.S. Pat. No. 4,305,205; U.S. Pat. No. 5,315,759; U.S. Patent No. Des. 312,953; U.S. Pat. No. 5,230,150; U.S. Pat. No. 4,890,385; and U.S. Pat. No. 4,802,278.

While these devices fulfill their respective, particular objectives and requirements, the aforementioned patents do not disclose a new cutting device. The inventive device includes a housing having separable first and second portions. The first and second portions each have an inner face and are pivotally coupled together such that the first and second portions are pivotable with respect to one another between an open position and a closed position. A bore extends between the first and second faces of the housing. The second portion of the housing has a pair of rollers mounted in the interior of the second portion. The rollers are positioned adjacent the bore such that a portion of each of the rollers extends into the bore. The first portion of the housing has a slot extending between the perimeter side wall and the inner face of the first portion of the housing. The slot also has an opening into the bore. A disk shaped cutting blade is disposed in the slot and mounted to the first portion of the housing such that a portion of the cutting blade extends into the bore.

In these respects, the cutting device according to the present invention substantially departs from the conventional concepts and designs of the prior art, and in so doing provides an apparatus primarily developed for the purpose of cutting tubing and piping.

SUMMARY OF THE INVENTION

In view of the foregoing disadvantages inherent in the known types of cutting devices for cutting tubing now present in the prior art, the present invention provides a new cutting device construction wherein the same can be utilized for cutting tubing and piping.

The general purpose of the present invention, which will be described subsequently in greater detail, is to provide a new cutting device apparatus and method which has many of the advantages of the cutting devices for cutting tubing mentioned heretofore and many novel features that result in a new cutting device which is not anticipated, rendered obvious, suggested, or even implied by any of the prior art cutting devices for cutting tubing, either alone or in any combination thereof.

To attain this, the present invention generally comprises a housing having separable first and second portions. The first and second portions each have an inner face and are pivotally coupled together such that the first and second portions are pivotable with respect to one another between an open position and a closed position. A bore extends between the first and second faces of the housing. The second portion of the housing has a pair of rollers mounted in the interior of the second portion. The rollers are positioned adjacent the bore such that a portion of each of the rollers extends into the bore. The first portion of the housing has a slot extending between the perimeter side wall and the inner face of the first portion of the housing. The slot also has an opening into the bore. A disk shaped cutting blade is disposed in the slot and mounted to the first portion of the housing such that a portion of the cutting blade extends into the bore.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cutting device apparatus and method which has many of the advantages of the cutting devices for cutting tubing mentioned heretofore and many novel features that result in a new cutting device which is not anticipated, rendered obvious, suggested, or even implied by any of the prior art cutting devices for cutting tubing, either alone or in any combination thereof.

It is another object of the present invention to provide a new cutting device which may be easily and efficiently manufactured and marketed.

It is a further object of the present invention to provide a new cutting device which is of a durable and reliable construction.

An even further object of the present invention is to provide a new cutting device which is susceptible of a low cost of manufacture with regard to both materials and labor, and which accordingly is then susceptible of low prices of sale to the consuming public, thereby making such cutting device economically available to the buying public.

Still yet another object of the present invention is to provide a new cutting device which provides in the apparatuses and methods of the prior art some of the advantages thereof, while simultaneously overcoming some of the disadvantages normally associated therewith.

Still another object of the present invention is to provide a new cutting device for cutting tubing and piping.

Yet another object of the present invention is to provide a new cutting device which includes a housing having separable first and second portions. The first and second portions each have an inner face and are pivotally coupled together such that the first and second portions are pivotable with respect to one another between an open position and a closed position. A bore extends between the first and second faces of the housing. The second portion of the housing has a pair of rollers mounted in the interior of the second portion. The rollers are positioned adjacent the bore such that a portion of each of the rollers extends into the bore. The first portion of the housing has a slot extending between the perimeter side wall and the inner face of the first portion of the housing. The slot also has an opening into the bore. A disk shaped cutting blade is disposed in the slot and mounted to the first portion of the housing such that a portion of the cutting blade extends into the bore.

Still yet another object of the present invention is to provide a new cutting device that is specifically designed for cutting high purity micro-fittings and tubing, especially in confined spaces where other conventional tubing cutters are too large to fit into.

Even still another object of the present invention is to provide a new cutting device that can cut piping and tubing in the middle of a weld.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention in the open position.

FIG. 4 is a schematic side view of the present invention.

FIG. 5 is a schematic side view of the present invention taken from the vantage of line 5—5 of FIG. 3.

FIG. 6 is a schematic sectional view of the present invention taken from line 6—6 of FIG. 4.

DESCRIPTION OF THE PREFERRED EMBODIMENT

Figure 1:
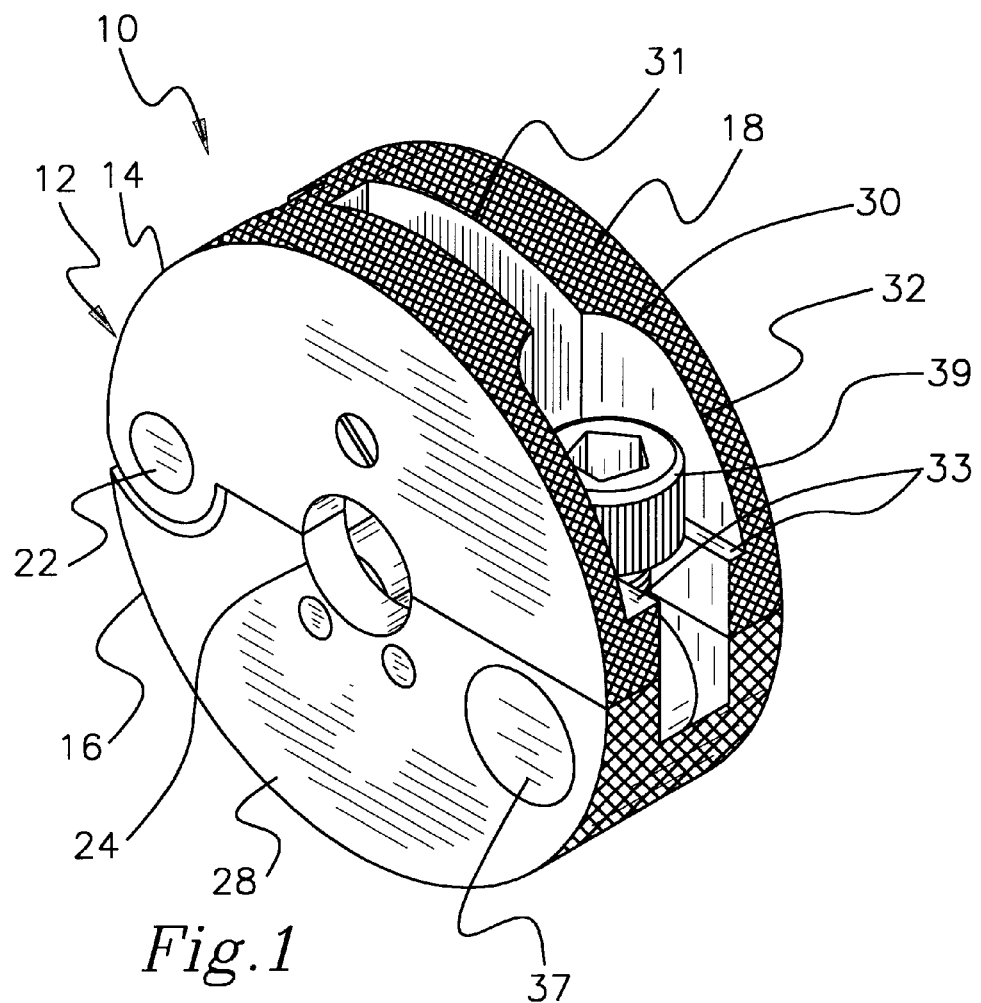
FIG. 1 is a schematic perspective view of a new cutting device in the closed position according to the present invention.
Figure 2:
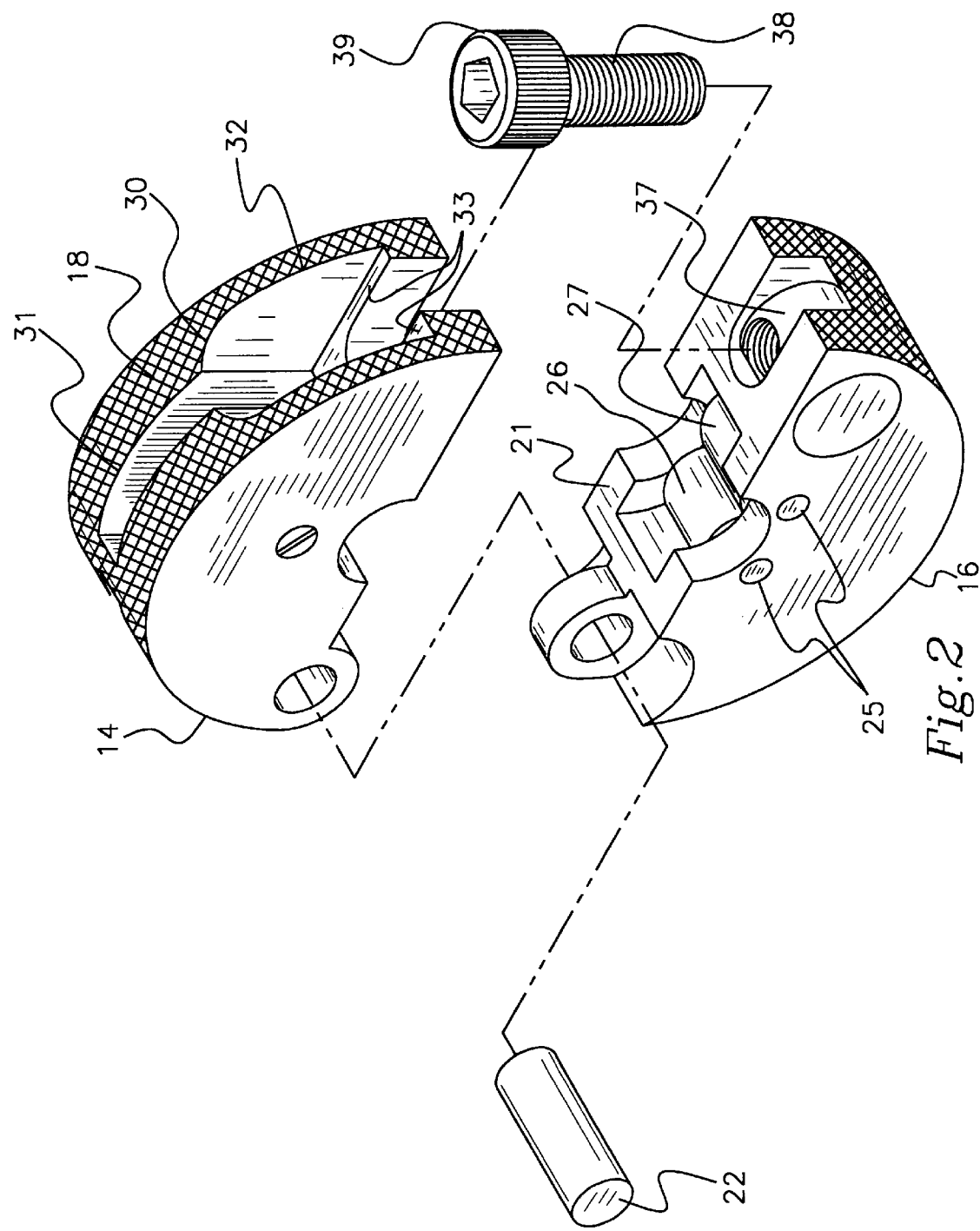
FIG. 2 is a schematic exploded perspective view of the present invention.

With reference now to the drawings, and in particular to FIGS. 1 through 6 thereof, a new cutting device embodying the principles and concepts of the present invention and generally designated by the reference numeral 10 will be described.

As best illustrated in FIGS. 1 through 6, the cutting device 10 generally comprises a housing 12 having separable first and second portions 14,16. The first and second portions 14,16 each have an inner face 20,21 and are pivotally coupled together such that the first and second portions 14,16 are pivotable with respect to one another between an open position and a closed position. A bore 24 extends between the first and second faces 28,29 of the housing 12. The second portion 16 of the housing 12 has a pair of rollers 26,27 mounted in the interior of the second portion 16. The rollers 26,27 are positioned adjacent the bore 24 such that a portion of each of the rollers 26,27 extends into the bore 24. The first portion 14 of the housing 12 has a slot 30 extending between the perimeter side wall 18 and the inner face 20 of the first portion 14 of the housing 12. The slot 30 also has an opening into the bore 24. A disk shaped cutting blade 34 is disposed in the slot 30 and mounted to the first portion 14 of the housing 12 such that a portion of the cutting blade 34 extends into the bore 24.

In use, the cutting device is designed for cutting tubing such as fittings and piping which are inserted into the bore 24. In closer detail, the cutting device includes a housing 12 with separable first and second portions 14,16. The housing 12 is preferably generally disc shaped and has an interior, a center, opposite first and second faces 28,29 and a perimeter side wall 18 between the first and second faces. Preferably, the perimeter side wall 18 has an enhanced friction outer surface, such as a knurled surface (with respect to a smooth surface), for aiding gripping of the perimeter side wall 18. Ideally, the housing 12 has a diameter of at least about 1½ inches and a width between the first and second faces of about ½ inch.

The first and second portions 14,16 are preferably generally semi-circular and each has a portion of the first and second faces of the housing 12, a portion of the perimeter side wall 18 of the housing 12, and a portion of the interior of the housing 12. Each of the portions 14,16 has an inner face 20,21 with each of the inner faces 20,21 having a first end and a second end. Preferably, the length of the inner faces 20,21 is generally equal to the diameter of the housing 12. The first ends of the inner faces 20,21 of the portions 14,16 of the housing 12 are pivotally coupled together by a pivot pin 22. The first and second portions 14,16 are pivotable with respect to one another between an open position (FIG. 3) and a closed position (FIG. 1). Preferably, as shown in FIGS. 1, 4, and 6, the inner faces 20,21 of the portions 14,16 face one another when the portions 14,16 are in the closed position.

A bore 24 is extended between the first and second faces 28,29 of the housing 12. Preferably, the bore 24 is generally cylindrical and is positioned at the center of the housing 12. The first portion 14 and the second portion 16 each have a portion of the bore 24. The second portion 16 of the housing 12 has a pair of cylindrical rollers 26,27 which are each rotationally mounted in the interior of the second portion 16 by an associated roller pin 25. The rollers 26,27 are positioned adjacent the bore 24 such that a portion of each of the rollers 26,27 extends into the bore 24. The rollers 26,27 are designed for aiding the rotation of the housing 12 about a pipe inserted into the bore 24 to help the cutting around the circumference of the tubing.

With reference to FIGS. 2, 4, 5, and 6, the first portion 14 of the housing 12 has a slot 30 extending between the perimeter side wall 18 and the inner face 20 of the first portion 14 of the housing 12. The slot 30 has an opening into the bore 24 and has a pair of sides extending between the ends of the slot 30. The sides of the slot 30 are preferably extended from the second end of the inner face 20 of the first portion 14 towards the second end of the inner face 20 of the first portion 14. Preferably, the slot 30 has first and second regions 31,32, with the first region 31 located towards the center of the housing 12, and the second region 32 located towards the second end of the inner face 20 of the first portion 14. Ideally, the first region 31 has a width between the sides of the slot 30 which is less than the width of the second region 32 between the sides of the slot 30. A disk shaped cutting blade 34 is disposed in the first region 31 of the slot 30 and rotationally mounted by a fastener to the first portion 14 of the housing 12 such that a portion of the cutting blade 34 extends into the bore 24. The cutting blade 34 is designed for cutting a tube or pipe inserted into the bore 24.

The preferred embodiment also includes a locking assembly 36 for locking the second ends of the inner faces 20,21 of the first and second portions 14,16 together when the first and second portions 14,16 are in the closed position as illustrated in FIG. 1. Preferably, the locking assembly 36 comprises a pivot member 37 and a threaded fastener 36. The pivot member 37 is pivotally coupled to the second portion 16 and is preferably located adjacent the second end of the inner face 21 of the second portion 16. The pivot member 37 is pivotable between a locked position (FIGS. 2 and 60 and a unlocked position (FIG. 3). The threaded fastener 38 has a threaded portion and a head portion 39. The threaded portion is threadedly inserted into a bore in the pivot member 37 such that the threaded fastener 38 is pivotable between the locked position (FIG. 6) and the unlocked position (FIG. 3) with the pivot member 37. As best illustrated in FIGS. 1 and 4, the head portion 39 of the threaded fastener 38 is insertable into the second region 32 of the slot 30 when the threaded fastener 38 is pivoted towards the locked position when the first and second portions 14,16 of the housing 12 are in the closed position. The second region 32 of the slot 30 preferably has a pair of shoulders 33 has a width therebetween narrower than the width of the second region 32 of the slot 30. A portion of the threaded portion of the threaded fastener 38 is inserted between the shoulders 33 when the threaded fastener 38 is in the locked position so that the head portion 39 of the threaded fastener 38 abuts above the shoulders 33 to hold the first portion 14 to the second portion 16.

In use, the device may be used to cut pipe, tubing and other fixtures inserted into the bore with the cutting blade by either rotating the housing 12 or the piping. The locking assembly may be used to hold or squeeze the piping in the bore between the cutting blade 34 and the rollers 26,27 when the threaded fastener 38 is tightened against the shoulders 33 of the slot 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cutting device, comprising:

a housing having separable first and second portions, an interior, a center, opposite first and second outer faces and a perimeter side wall extending between said first and second outer faces;

said first and second portions each having a portion of said first and second outer faces of said housing, a portion of said perimeter side wall of said housing, and a portion of said interior of said housing, each of said first and second portions having an inner face each of said inner faces having a first end and a second end;

said first ends of said inner faces of said portions of said housing being pivotally coupled together, said first and second portions being pivotable with respect to one another between an open position and a closed position, wherein said inner faces of said portions face one another when said portions are in said closed position;

a bore being extended between said first and second outer faces of said housing, said first portion and said second portion each having a portion of said bore;

said second portion of said housing having a pair of rollers being rotationally mounted in the interior of said second portion, said rollers being positioned adjacent said bore such that a portion of each of said rollers extends into said bore;

said first portion of said housing having a slot extending between said perimeter side wall and said inner face of said first portion of said housing, said slot having an opening into said bore said slot having a first region and a second region, said second region being positioned adjacent to said second end of said inner face;

a disk shaped cutting blade being disposed in said first region of said slot and mounted to said first portion of said housing such that a portion of said cutting blade extends into said bore, a locking assembly for locking said second ends of said inner faces of said first and second portions together when said first and second portions are in said closed position; and wherein said locking assembly comprises:

a pivot member being pivotally coupled to said second portion, said pivot member being located adjacent said second end of said inner face of said second portion, said pivot member being pivotable between a locked position and a unlocked position; and a threaded fastener having a threaded portion and a head portion said threaded portion being threadedly inserted into said pivot member such that said threaded fastener is pivotable between said locked position and said unlocked position of said pivot member, said head portion of said threaded fastener being insertable into said second region of said slot such that said head portion is recessed within said second region of said slot when said threaded fastener is fully pivoted towards said locked position and said first and second portions of said housing are in said closed position, said first region of said slot being thinner than said head of said threaded fastener whereby said head portion is prevented from entering said first region of said slot for preventing said threaded fastener from contacting said blade in said first region of said slot.

2. The device of claim 1, wherein said housing is generally disc shaped, said first and second portions being generally semi-circular.

3. The device of claim 1, wherein said bore is positioned at said center of said housing.

4. The device of claim 1, wherein said perimeter side wall has a frictional outer surface.

5. The device of claim 1, wherein said bore is generally cylindrical.

6. The device of claim 1, wherein said slot has a pair of sides extending between said ends of said slot, said sides of said slot being extended from said second end of said inner face of said first portion.

7. A cutting device, comprising:

a housing having separable first and second portions, said housing being generally disc shaped and having an interior, a center, opposite first and second outer faces and a perimeter side wall between said first and second outer faces;

wherein said perimeter side wall has a frictional outer surface;

said first and second portions being generally semi-circular and each having a portion of said first and second outer faces of said housing, a portion of said perimeter side wall of said housing, and a portion of said interior of said housing, each of said first and second portions having an inner face extending between said first and second outer faces such that each said inner face is substantially orthogonal to said first and second outer faces, each of said inner faces having a first end and a second end;

said first ends of said inner faces of said portions of said housing being pivotally coupled together, said first and second portions being pivotable with respect to one another between an open position and a closed position, wherein said inner faces of said portions face one another when said portions are in said closed position;

a bore being extended between said first and second outer faces of said housing, said bore is positioned at said center of said housing, said bore being generally cylindrical, said first portion and said second portion each having a portion of said bore;

said second portion of said housing having a pair of rollers being rotationally mounted in the interior of said second portion, said rollers being positioned adjacent said bore such that a portion of each of said rollers extends into said bore;

said first portion of said housing having a slot extending between said perimeter side wall and said inner face of said first portion of said housing, said slot having an opening into said bore, said slot having a first region and a second region, said second region being positioned adjacent to said second end of said inner face, said slot having a pair of sides extending between said ends of said slot, said sides of said slot being extended from said second end of said inner face of said first portion;

a disk shaped cutting blade being disposed in said slot and rotationally mounted to said first portion of said housing such that a portion of said cutting blade extends into said bore; and a locking assembly for locking said second ends of said inner faces of said first and second portions together when said first and second portions are in said closed position;

said locking assembly comprising:

a pivot member being pivotally coupled to said second portion, said pivot member being located adjacent said second end of said inner face of said second portion, said pivot member being pivotable between a locked position and a unlocked position; and a threaded fastener having a threaded portion and a head portion, said threaded portion being threadedly inserted into said pivot member such that said threaded fastener is pivotable between said locked position and said unlocked position of said pivot member, said head portion of said threaded fastener being insertable into said second region of said slot such that said head portion is recessed within said second region of said slot when said threaded fastener is fully pivoted towards said locked position and said first and second portions of said housing are in said closed position, said first region of said slot being thinner than a width of said head of said threaded fastener whereby said head portion is prevented from entering said first region of said slot for preventing said threaded fastener from contacting said blade in said first region of said slot.

* * * * *